US012785804B2

(12) United States Patent
Burtsev et al.

(10) Patent No.: US 12,785,804 B2
(45) Date of Patent: Nov. 3, 2026

(54) METHOD AND NETWORK CONTROL DEVICE FOR COMPUTING A SET OF OPTIMAL AMPLIFICATION PARAMETERS FOR A SPAN OF A MULTI-SPAN OPTICAL FIBER NETWORK

(71) Applicant: Adtran Networks SE, Meiningen (DE)

(72) Inventors: Sergey Burtsev, Fruithurst, AL (US); Sorin Tibuleac, Johns Creek, GA (US)

(73) Assignee: Adtran Networks SE, Meiningen (DE)

( * ) Notice: Subject to any disclaimer, the term of this patent is extended or adjusted under 35 U.S.C. 154(b) by 273 days.

(21) Appl. No.: 18/787,215

(22) Filed: Jul. 29, 2024

(65) Prior Publication Data

US 2026/0031908 A1 Jan. 29, 2026

(51) Int. Cl.
*H04B 10/2537* (2013.01)

(52) U.S. Cl.
CPC ................................ *H04B 10/2537* (2013.01)

(58) Field of Classification Search
None
See application file for complete search history.

(56) References Cited

U.S. PATENT DOCUMENTS 8,055,129 B2 * 11/2011 Butler ............... H04J 14/02216 398/94
8,594,499 B1 * 11/2013 Roberts ................ H04B 10/073 398/28
9,641,252 B2 * 5/2017 Nijhof ................ H04B 10/2543
9,831,947 B2 * 11/2017 Boertjes ............. H04B 10/0793
10,171,161 B1 * 1/2019 Côté .................. H04B 10/6161
10,236,982 B1 * 3/2019 Zhuge .................. H04B 10/073
10,404,376 B2 * 9/2019 Schmogrow ....... H04B 10/2543
10,784,980 B2 * 9/2020 Roberts .............. H04B 10/0793
10,965,371 B2 * 3/2021 Jiang ...................... H04B 10/61
11,489,597 B2 * 11/2022 Tibuleac ................ H04B 10/27
2015/0304035 A1 * 10/2015 Nijhof ................ H04B 10/0793 398/26

(Continued)

OTHER PUBLICATIONS

Extended European Search Report issued in EP25178512.7 on Nov. 20, 2025.

(Continued)

*Primary Examiner* — Jai M Lee
(74) *Attorney, Agent, or Firm* — The Webb Law Firm

(57) ABSTRACT

A method for computing a set of optimal amplification parameters for a span of a multi-span optical fiber network. Each span has an associated optical transmission fiber connected to associated amplifiers. The associated amplifiers include a forward Raman amplifier and at least one discrete amplifier. Gain and output power of the at least one discrete amplifier is respectively controlled independently. The method includes the steps of providing an analytical form of the signal power evolution along the corresponding span; computing a linear noise from amplifier noise figures and a non-linear noise generated in the corresponding span based on information about the span and the analytical form of the signal power evolution and using the computed linear noise and non-linear noise to compute the impact on the span performance; and computing a set of optimal amplification parameters for the corresponding span based on the impact on the span performance.

15 Claims, 3 Drawing Sheets

(56) References Cited

U.S. PATENT DOCUMENTS

| | | | | |
|---|---|---|---|---|
| 2025/0379651 | A1* | 12/2025 | Yan | H04B 10/071 |
| 2026/0058751 | A1* | 2/2026 | Striegler | H04J 14/026 |

OTHER PUBLICATIONS

Galdino et al., Study on the Impact of Nonlinearity and Noise on the Performance of High-Capacity Broadband Hybrid Raman-EDFA Amplified System, Journal of Lightwave Technology, vol. 37, No. 21, Nov. 1, 2019, pp. 5507-5515.

Joao et al., Optimal Placement of Hybrid Erbium-Doped Fiber/Raman Amplifiers in DWDM Networks, IEEE Global Communications Conference: Optical Networks and Systems, 2022, pp. 2939-2944.

* cited by examiner

METHOD AND NETWORK CONTROL DEVICE FOR COMPUTING A SET OF OPTIMAL AMPLIFICATION PARAMETERS FOR A SPAN OF A MULTI-SPAN OPTICAL FIBER NETWORK

BACKGROUND OF THE INVENTION

Field of the Invention

The present application relates to optical communication systems and, in particular, to a method for computing a set of optimal amplification parameters and possibly also an optimal input signal power in each span of a multi-span optical fiber network separately, wherein the set of optimal amplification parameters can then be used to optimize performance of the multi-span optical fiber network.

Description of Related Art

In an optical fiber transmission line of an optical communication system, an optical amplifier couples sequentially related optical transmission fiber spans. The amplifiers produce adequate optical gains to compensate for power losses to optical signals in the immediately preceding fiber span and other elements. An optical amplifier is a device that amplifies an optical signal directly, without the need to first convert it to an electrical signal.

Therein, usually discrete amplifiers, such as an erbium-doped fiber amplifier, are used. Nevertheless, additional improvement in optical signal-to-noise ratio (OSNR) can be achieved with distributed Raman amplifiers, using on a fiber span either on or both of backward-pumped Raman amplifiers and forward-pumped Raman amplifiers. Raman amplification is a process that enhances the strength of optical signals by using stimulated Raman scattering within an optical fiber, whereby a signal power distribution along the span with a better signal OSNR can be achieved. The amplification effect is achieved by a nonlinear interaction between the signal and a pump laser within an optical fiber. Therein, the pump light can be introduced into the optical fiber in two directions: forward pump, in which the pump light is in the same direction as the signal light, and backward pump, in which the pump light is in the opposite direction as the signal light.

Further, network operators have a strong interest in making most efficient use of their investments in the network infrastructure, and therefore, a strong interest in achieving the highest transmission capacity through the fiber optical transmission lines in the network.

Therein, for most fiber optical transmission lines impairments determining the total capacity of the fiber within a given bandwidth are linear system noise, called amplified spontaneous emission (ASE) noise, produced by optical amplifiers along the line and fiber nonlinear effects. It is also known that the power of the optical signal launched into each span is a critical parameter of the system, which determines the capacity that can be attained. Therefore, the optimization of optical amplification parameters, respectively the parameters of the optical amplifiers is important to optimize the performance of the network.

U.S. Pat. No. 11,489,597 discloses a method for optimizing performance of a multi-span optical fiber network. Each span has an associated optical transmission fiber connected to an associated optical amplifier. Gain and output power of the associated optical amplifier are respectively controlled independently. An amplifier noise figure respectively depends on the gain of the associated optical amplifier, with each associated optical amplifier further connected to launch optical signals into a remainder of a corresponding optical transmission line. The method includes the steps of for each span, computing the amplifier noise figure, and a non-linear noise generated in the span based on information about the span and using the computed amplifier noise figure and the computed non-linear noise to compute an optimum launch power, and optimizing performance of the multi-span optical fiber network based on the computed optimum launch powers of all spans.

If now however a forward Raman is used to achieve an improved optical signal-to-noise ratio and to compensate signal, respectively power loss, the signal profile also changes, wherefore the computation of the optimal optical amplification parameters has to be amended, too. Here, signal profile means the signal power distribution along the optical fiber span. In particular, forward Raman gain improves the optical signal-to-noise-ratio of the corresponding span, but also affects strongly nonlinear properties of each span as it defines the signal power profile within a span. Therein, one known approach is the trial-and-error numerical optimization, which requires many successive simulations with Raman-enabled system simulators, whereby the individual amplifier gain levels and launch power are iteratively changed while observing the impact on the link performance. Another known approach is complex and impractical being computationally intensive, wherein not only the system related parameters such as gain and power levels are optimized but, also sub-system ones, like Raman pump wavelengths. Therefore, there is a need for an improved method for the computation of optimal optical amplification parameters.

SUMMARY OF THE INVENTION

According to one embodiment of the present invention, a method for computing a set of optimal amplification parameters for a span of a multi-span optical fiber network is provided, wherein each span has an associated optical transmission fiber connected to associated optical amplifiers, wherein the associated optical amplifiers include a forward Raman amplifier and at least one discrete amplifier, wherein gain and output power of the at least one discrete amplifier are respectively controlled independently, wherein the last one of the at least one discrete amplifier is connected to launch optical signals into a remainder of a corresponding optical transmission line, and wherein the method comprises the steps of providing an analytical form of the signal power evolution along the corresponding span, computing a linear noise from amplifier noise figures and a non-linear noise generated in the corresponding span based on information about the span and the analytical form of the signal power evolution and using the computed linear noise and non-linear noise to compute the impact on the span performance, respectively regarding the transmission capacity, and computing a set of optimal amplification parameters for the corresponding span, respectively optimal parameters for the corresponding associated amplifiers based on the impact on the span performance.

Therein, that gain and output power of the at least one discrete amplifier is respectively controlled independently, wherein an amplifier noise figure usually respectively depends on the gain of the amplifier, means that the corresponding discrete amplifier is an associated amplifier with independent gain and output power controls and amplifier noise figure dependence on amplifier gain. Therein, for example the control of the output power can be integrated in the optical amplifier but can also be established independently of the optical amplifier.

Further, that a linear noise is computed from amplifier noise figures and non-linear noise generated in the span is computed means that this parameter, respectively information characterizing the parameter is derived respectively calculated by methods of functional analysis and numerical mathematics.

Thus, a method for computing a set of optimal amplification parameters for a span of a multi-span optical fiber network is provided, wherein the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

The multi-span optical fiber network is preferably a wavelength-division multiplexing (WDM) network, wherein the optimization can be used for any wavelength division multiplexing network, irrespective of the network topology, for example point-to-point, ring, or meshed networks, with any combination of network nodes which use amplifiers with gain and output power control including terminal sites, fixed optical add-drop, reconfigurable optical add-drop multiplexer, or amplifier nodes.

The information about the span can include span length, span loss, information about the associated transmission fiber, information about the associated amplifiers, a symbol rate of a corresponding transceiver and a system channel plan.

Here, the span length can for example include information about a total length of the span.

The span loss is the ratio of the power level at the beginning of the corresponding span and the power level at the end of the corresponding span.

The information about the associated transmission fiber can include information about characteristics of the fiber that influence signals travelling along the span, for example fiber attenuation and/or fiber dispersion and effective area.

The information about the associated amplifiers can include information that influences the settings of the associated amplifiers, for example the power of pump.

The symbol rate of the corresponding transceiver is the number of symbols of information transmitted per second, where symbols can be encoded onto an optical signal by modulating in time optical properties such as amplitude, phase, and polarization.

The system channel plan can further include information about the components used along the span, for example information about the associated amplifiers.

Therefore, the information about the span can include all relevant parameters of the fiber and information about components which can impact the value of the optimal amplification parameters. Thus, all information might be taken into account that can impact the optimal amplification parameters, wherefore the optimal amplification parameters can be computed fast but also as precisely as possible.

However, that the information about the span includes a span length, information about the associated transmission fiber, information about the associated amplifiers, a symbol rate of a corresponding transceiver and a system channel plan should merely be understood as an example, and in some embodiments the information about the span can for example also include information about the optical amplifier tilt.

Further, the set of optimal amplification parameters can comprise one or more of an optimal value of the forward Raman gain, an optimal value of the gain of the at least one discrete amplifier, and an optimal value of a signal input power launched into the corresponding span. In particular, the set of optimal amplification parameters can comprise optimal values for all parameters that are necessary to achieve the highest transmission capacity through the span.

Based on the optimal amplification parameters and the signal input power then a maximum generalized optical signal-to-noise ratio can be calculated, which is the best metric for system characterization, and wherein the corresponding maximum generalized optical signal-to-noise ratio can be used to optimize performance of the span and the whole multi-span optical fiber network. In particular, maximizing the generalized optical signal-to-noise ratio or a related metric can produce a comparatively high capacity and/or comparatively long transmission distances.

However, that the set of optimal amplification parameters comprises one or more of an optimal value of the forward Raman gain, an optimal value of the gain of the at least one discrete amplifier, and an optimal value of a signal input power launched into the corresponding span should merely be understood as an example, and in some embodiments the set of optimal amplification parameters can for example also include an optimal value of a backward Raman gain.

Therein, for each span, the computed linear and non-linear noises can in particular be used to calculate a generalized optical signal-to-noise-ratio of the span. Further, the calculated generalized optical signal-to-noise-ratio can then be used to compute the set of optimal amplification parameters.

Also, linear equivalents of the information about the span, respectively parameters representing the information about the span with linear units can be used to compute the impact on the span performance. Thereby, the required computational effort can be further reduced, as non-linear terms and equations can be transformed into linear equations.

In one embodiment, the set of optimal amplification parameters is computed during a planning phase of a network deployment, wherein preliminary or typical values are chosen for the information about the span. Thus, the computation can be applicable in the network planning process, wherein a network operator is provided with an assessment of the capacity that can be achieved on a given fiber transmission line with a given set of transmission equipment, for example a given set of wavelength-division multiplexing transmission equipment such as transceivers, amplifiers, reconfigurable optical add/drop multiplexers and other wavelength-division multiplexing system components. Therefore, the network operator can deploy the network components already during the network planning phase in such a way that the highest transmission capacity through fiber transmission lines in the network is achieved.

Therein, in the multi-span optical fiber network pairs of nodes of the network can be associated with distinct bands of optical channels used for communication between the pairs of nodes, wherein the generalized optical signal-to-noise-ratio can be calculated for the central channel, and wherein the generalized optical signal-to-noise-ratio of the central channel can be used to compute the set of optimal amplification parameters. That the generalized optical signal-to-noise-ratio is calculated only for the central channel, wherein the generalized optical signal-to-noise-ratio of the central channel is used to optimize the multi-span optical fiber network has the advantage that the computational effort required to optimize the multi-span optical fiber network can be further reduced. Therein, the central channel is assumed for simplicity and numerical speed-up, to be the worst one in performance due to larger nonlinear noise accumulation, compared with other channels.

In a further embodiment, the set of optimal amplification parameters is computed as part of a network turn-up and commissioning, wherein exact values are chosen for the information about the span. Thus, the computation can also be applicable to optimize the multi-span optical fiber network during line turn-up/commissioning, and therefore, after the system equipment has been deployed and turned up in the field. Therein, the fact that exact values, or more accurate values, that can be provided by a system management software are chosen for the information about the span has the advantage that the effectiveness of the method can be further improved. In particular, during line turn-up/commissioning, the system management software can provide more accurate data for span lengths and span losses for re-evaluation of the system performance. Similarly, a corresponding field-based characterization of the noise figure of the amplifier can be chosen.

Therein, in the multi-span optical fiber network pairs of nodes of the network can be associated with distinct bands of optical channels used for communication between the pairs of nodes, wherein a generalized optical signal-to-noise-ratio can be calculated for each channel separately, wherein a worst generalized optical signal-to-noise-ratio is determined from the calculated generalized optical signal-to-noise-ratios, and wherein the worst generalized optical signal-to-noise-ratio can be used to compute the set of optimal amplification parameters. Thus, the effectiveness of the method can be further improved by removing the assumption that the central channel is the worst performing channel, which may not be the worst performing channel in the field, wherein at the same time the computational effort required to optimize the performance of the multi-span optical fiber network can be further reduced.

According to another embodiment of the invention, a method for setting amplification parameters for a span of a multi-span optical fiber network is provided, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is connected to launch optical signals into a remainder of a corresponding optical transmission line, and wherein the method comprises the steps of computing a set of optimal amplification parameters for the corresponding span using a method for computing a set of optimal amplification parameters for a span of a multi-span optical fiber network as described above, and setting the amplification parameters of the corresponding span based on the computed set of optimal amplification parameters.

Thus, a method for setting amplification parameters for a span of a multi-span optical fiber network is provided, wherein the amplification parameters are set based on amplification parameters computed by a method for computing a set of optimal amplification parameters for a span of a multi-span optical fiber network, based on which the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

According to still another embodiment of the invention, a network control device for computing a set of optimal amplification parameters for a span of a multi-span optical fiber network is provided, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is connected to launch optical signals into a remainder of a corresponding optical transmission line, and wherein the network control device comprises a providing unit, wherein the providing unit is configured to provide an analytical form of the signal power evolution along the corresponding span, a first computing unit, wherein the first computing unit is configured to compute linear noise from amplifier noise figures and a non-linear noise generated in the corresponding span based on information about the span and the analytical form of the signal power evolution and to use the computed linear noise and non-linear noise to compute the impact on the span performance, and a second computing unit, wherein the second computing unit is configured to compute a set of optimal amplification parameters for the corresponding span based on the impact on the span performance.

Therein, that gain and output power of the at least one discrete amplifier is respectively controlled independently, wherein an amplifier noise figure usually respectively depends on the gain of the amplifier, means that the corresponding discrete amplifier is an optical associated amplifier with independent gain and output power controls and amplifier noise figure dependence on amplifier gain. Therein, for example the control of the output power can be integrated in the optical amplifier but can also be established independently of the optical amplifier.

Further, that a linear noise is computed from amplifier noise figures and non-linear noise generated in the span is computed means that this parameter, respectively information characterizing the parameter is derived respectively calculated by methods of functional analysis and numerical mathematics.

Thus, a network control device for computing a set of optimal amplification parameters for a span of a multi-span optical fiber network is provided, wherein the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

The multi-span optical fiber network is preferably a wavelength-division multiplexing (WDM) network, wherein the optimization can be used for any wavelength-division multiplexing network, irrespective of the network topology, for example point-to-point, ring, or meshed networks, with any combination of network nodes which use amplifiers with gain and output power control including terminal sites, fixed optical add-drop, reconfigurable optical add-drop multiplexer, or amplifier nodes.

The information about the span can include span length, span loss, information about the associated transmission fiber, information about the associated amplifiers, a symbol rate of a corresponding transceiver and a system channel plan. Therefore, the information about the span can include all relevant parameters of the fiber and information about components which can impact the value of the optimal amplification parameters. Thus, all information might be taken into account that can impact the optimal amplification parameters, wherefore the optimal amplification parameters can be computed as precisely as possible.

However, that the information about the span includes a span length, information about the associated transmission fiber, information about the associated amplifiers, a symbol rate of a corresponding transceiver and a system channel plan should merely be understood as an example, and in some embodiments the information about the span can for example also include information about the optical amplifier tilt.

Further, the set of optimal amplification parameters can comprise one or more of an optimal value of the forward Raman gain, an optimal value of the gain of the at least one discrete amplifier, and an optimal value of a signal input power launched into the corresponding span. In particular, the set of optimal amplification parameters can comprise optimal values for all parameters that are necessary to achieve the highest transmission capacity through the span.

Based on the optimal amplification parameters and the signal input power then a maximum generalized optical signal-to-noise ratio can be calculated, which is the best metric for system characterization, and wherein the corresponding maximum generalized optical signal-to-noise ratio can be used to optimize performance of the span and the whole multi-span optical fiber network.

However, that the set of optimal amplification parameters comprises one or more of an optimal value of the forward Raman gain, an optimal value of the gain of the at least one discrete amplifier, and an optimal value of a signal input power launched into the corresponding span should merely be understood as an example, and in some embodiments the set of optimal amplification parameters can for example also include an optimal value of a backward Raman gain.

Therein, for each span, the computed linear and non-linear noises can in particular be used to calculate a generalized optical signal-to-noise-ratio of the span. Further, the calculated generalized optical signal-to-noise-ratio can then be used to compute the set of optimal amplification parameters.

Also, linear equivalents of the information about the span, respectively parameters representing the information about the span with linear units can be used to compute the impact on the span performance Thereby, the required computational effort can be further reduced, as non-linear terms and equations can be transformed into linear equations.

In one embodiment, the set of optimal amplification parameters is computed during a planning phase of a network deployment, wherein preliminary or typical values are chosen for the information about the span. Thus, the computation can be applicable in the network planning process, wherein a network operator is provided with an assessment of the capacity that can be achieved on a given fiber transmission line with a given set of transmission equipment, for example a given set of wavelength-division multiplexing transmission equipment such as transceivers, amplifiers, reconfigurable optical add/drop multiplexers and other wavelength-division multiplexing system components. Therefore, the network operator can deploy the network components already during the network planning phase in such a way that the highest transmission capacity through fiber transmission lines in the network is achieved.

Therein, in the multi-span optical fiber network pairs of nodes of the network can be associated with distinct bands of optical channels used for communication between the pairs of nodes, wherein the generalized optical signal-to-noise-ratio can be calculated for the central channel, and wherein the generalized optical signal-to-noise-ratio of the central channel can be used to compute the set of optimal amplification parameters. That the generalized optical signal-to-noise-ratio is calculated only for the central channel, wherein the generalized optical signal-to-noise-ratio of the central channel is used to optimize the multi-span optical fiber network has the advantage that the computational effort required to optimize the multi-span optical fiber network can be further reduced. Therein, the central channel is assumed for simplicity and numerical speed-up, to be the worst one in performance due to larger nonlinear noise accumulation, compared with other channels.

In a further embodiment, the set of optimal amplification parameters is computed as part of a network turn-up and commissioning, wherein exact values are chosen for the information about the span. Thus, the computation can also be applicable to optimize the multi-span optical fiber network during line turn-up/commissioning, and therefore, after the system equipment has been deployed and turned up in the field. Therein, the fact that exact values, or more accurate values, that can be provided by a system management software are chosen for the information about the span has the advantage that the effectiveness of the method can be further improved. In particular, during line turn-up/commissioning, the system management software can provide more accurate data for span lengths and span losses for re-evaluation of the system performance. Similarly, a corresponding field-based characterization of the noise figure of the amplifier can be chosen.

Therein, in the multi-span optical fiber network pairs of nodes of the network can be associated with distinct bands of optical channels used for communication between the pairs of nodes, wherein a generalized optical signal-to-noise-ratio can be calculated for each channel separately, wherein a worst generalized optical signal-to-noise-ratio is determined from the calculated generalized optical signal-to-noise-ratios, and wherein the worst generalized optical signal-to-noise-ratio is used to compute the set of optimal amplification parameters. Thus, the effectiveness of the method can be further improved by removing the assumption that the central channel is the worst performing channel, which may not be the worst performing channel in the field, wherein at the same time the computational effort required to optimize the performance of the multi-span optical fiber network can be further reduced.

According to still a further embodiment of the invention, a system for setting amplification parameters for a span of a multi-span optical fiber network is provided, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is connected to launch optical signals into a remainder of a corresponding optical transmission line, and wherein the system comprises a network control device for computing a set of optimal amplification parameters for a span of a multi-span optical fiber network as described above, and a setting unit, wherein the setting unit is configured to set the amplification parameters of the corresponding span based on a set of optimal amplification parameters computed by the network control device.

Thus, a system for setting amplification parameters for a span of a multi-span optical fiber network is provided, wherein the amplification parameters are set based on amplification parameters computed by a network control device for computing a set of optimal amplification parameters for a span of a multi-span optical fiber network based on which the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

According to a further embodiment of the invention, a program product is provided comprising a computer-readable storage medium that stores code executable by a processor. Therein, the executable code comprises code to:

- Provide an analytical form of the signal power evolution along the corresponding span;
- Compute a linear noise from amplifier noise figures and a non-linear noise generated in the corresponding span based on information about the span and the analytical form of the signal power evolution and using the computed linear noise and non-linear noise to compute the impact on the span performance; and
- Compute a set of optimal amplification parameters for the corresponding span based on the impact on the span performance.

In particular, a microprocessor, respectively a computer program product comprising a computer-readable storage medium that stores code executable by a processor to execute a method for computing a set of optimal amplification parameters as described above is provided.

Thus, a program product that is configured to execute a method for computing a set of optimal amplification parameters for a span of a multi-span optical fiber network is provided, wherein the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

BRIEF DESCRIPTION OF THE DRAWINGS

Embodiments of the invention will now be described with reference to the drawings.

DESCRIPTION OF THE INVENTION

Figure 1:
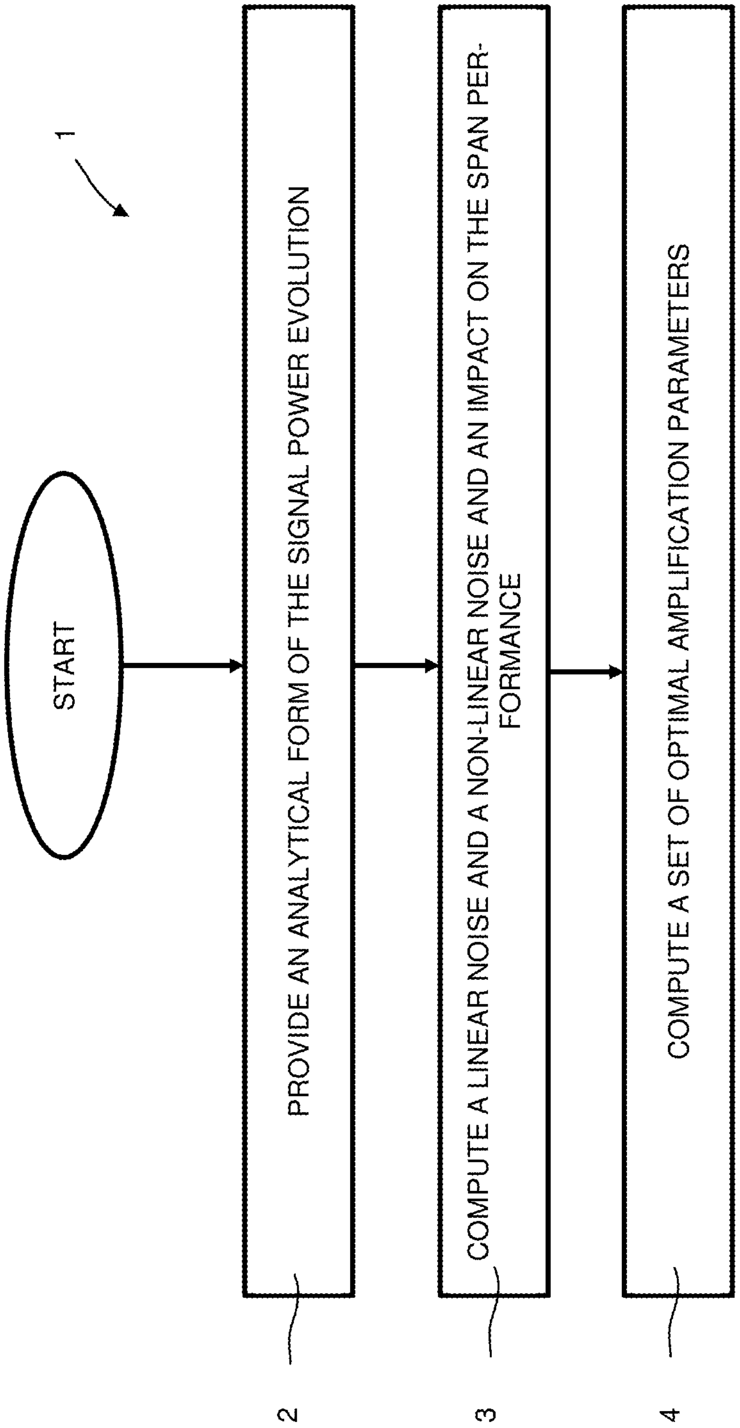
FIG. 1 illustrates a flowchart of a method for computing a set of optimal amplification parameters for a span of a multi-span optical fiber network according to embodiments of the invention.

FIG. 1 illustrates a flowchart of a method for computing a set of optimal amplification parameters for a span of a multi-span optical fiber network 1 according to embodiments of the invention.

In particular, FIG. 1 illustrates a flowchart of a method for computing a set of optimal amplification parameters for a span of a multi-span optical fiber network 1, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is respectively connected to launch optical signals into a remainder of a corresponding optical transmission line.

In an optical fiber transmission line of an optical communication system, an optical amplifier couples sequentially related optical transmission fiber spans. The amplifiers produce adequate optical launch powers to compensate for power losses to optical signals in the immediately preceding fiber span and other elements. An optical amplifier is a device that amplifies an optical signal directly, without the need to first convert it to an electrical signal.

Therein, usually discrete amplifiers, for example laser amplifiers, such as an erbium-doped fiber amplifier, or semiconductor amplifiers are used. Nevertheless, additional improvement in optical signal-to-noise ratio (OSNR) can be achieved with distributed Raman amplifiers, using on a fiber span either on or both of backward-pumped Raman amplifiers and forward-pumped Raman amplifiers. Raman amplification is a process that enhances the strength of optical signals by using stimulated Raman scattering within an optical fiber, whereby better power profiles can be achieved. The amplification effect is achieved by a nonlinear interaction between the signal and a pump laser within an optical fiber. Therein, the pump light can be introduced into the optical fiber in two directions: forward pump, in which the pump light is in the same direction as the signal light, and backward pump, in which the pump light is in the opposite direction as the signal light.

If now however a forward Raman is used to achieve an improved optical signal-to-noise ratio and to compensate signal, respectively power loss, the signal profile also changes, wherefore the computation of the optimal optical amplification parameters has to be amended, too. In particular, forward Raman gain improves the optical signal-to-noise-ratio of the corresponding span, but also affects strongly nonlinear properties of each span as it defines the signal power profile within a span. Therein, one known approach is the trial-and-error numerical optimization, which requires many successive simulations with Raman-enabled system simulators, whereby the individual amplifier gain levels and launch power are iteratively changed while observing the impact on the link performance. Another known approach is complex and impractical being computationally intensive, wherein not only the system related parameters such as gain and power levels are optimized but, also sub-system ones, like Raman pump wavelengths. Therefore, there is a need for an improved method for the computation of optimal optical amplification parameters.

According to the embodiments of FIG. 1, this object is solved by a method for computing a set of optimal amplification parameters for a span of a multi-span optical fiber network 1, which comprises the steps of providing an analytical form of the signal power evolution along the corresponding span 2, computing a linear noise from amplifier noise figures and a non-linear noise generated in the corresponding span based on information about the span and the analytical form of the signal power evolution and using the computed linear noise and non-linear noise to compute the impact on the span performance 3, and computing a set of optimal amplification parameters for the corresponding span based on the impact on the span performance 4.

Thus, a method for computing a set of optimal amplification parameters for a span of a multi-span optical fiber network 1 is provided, wherein the determination of the optimal amplification parameters can be practical, accurate and fast to execute, as all relevant parameters that can impact the value of the optimum launch power are taken into account, and as the computation is based on an analytical formula of the signal power evolution, respectively the signal power profile. Therein, the information about the span preferably includes all relevant parameters of the fiber and information about components which can impact the value of the amplification parameters. Further, as the optimal amplification parameters might be separately computed for each span, a global transmission fiber line optimization problem can be reduced to a local per span optimization problem, which can make the optimization numerically very fast, while supporting multi-span transmission fiber lines with different types of fiber in different spans. Therefore, the method might also address the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

The information about the span can include span length, information about the associated transmission fiber, information about the associated amplifiers, a symbol rate of a corresponding transceiver and a system channel plan.

Further, the set of optimal amplification parameters can comprise one or more of an optimal value of the forward Raman gain, an optimal value of the gain of the at least one discrete amplifier, and an optimal value of a signal input power launched into the corresponding span.

Also, parameters representing the information about the span with linear units can be used to compute the amplifier noise figure.

In one embodiment, the set of optimal amplification parameters is computed during a planning phase of a network deployment, wherein preliminary or typical values are chosen for the information about the span.

In a further embodiment, the set of optimal amplification parameters is computed as part of a network turn-up and commissioning, wherein exact values are chosen for the information about the span.

The optimization can be carried out, respectively repeated for each span, to achieve maximum performance across the entire multi-span optical fiber network.

Figure 2:
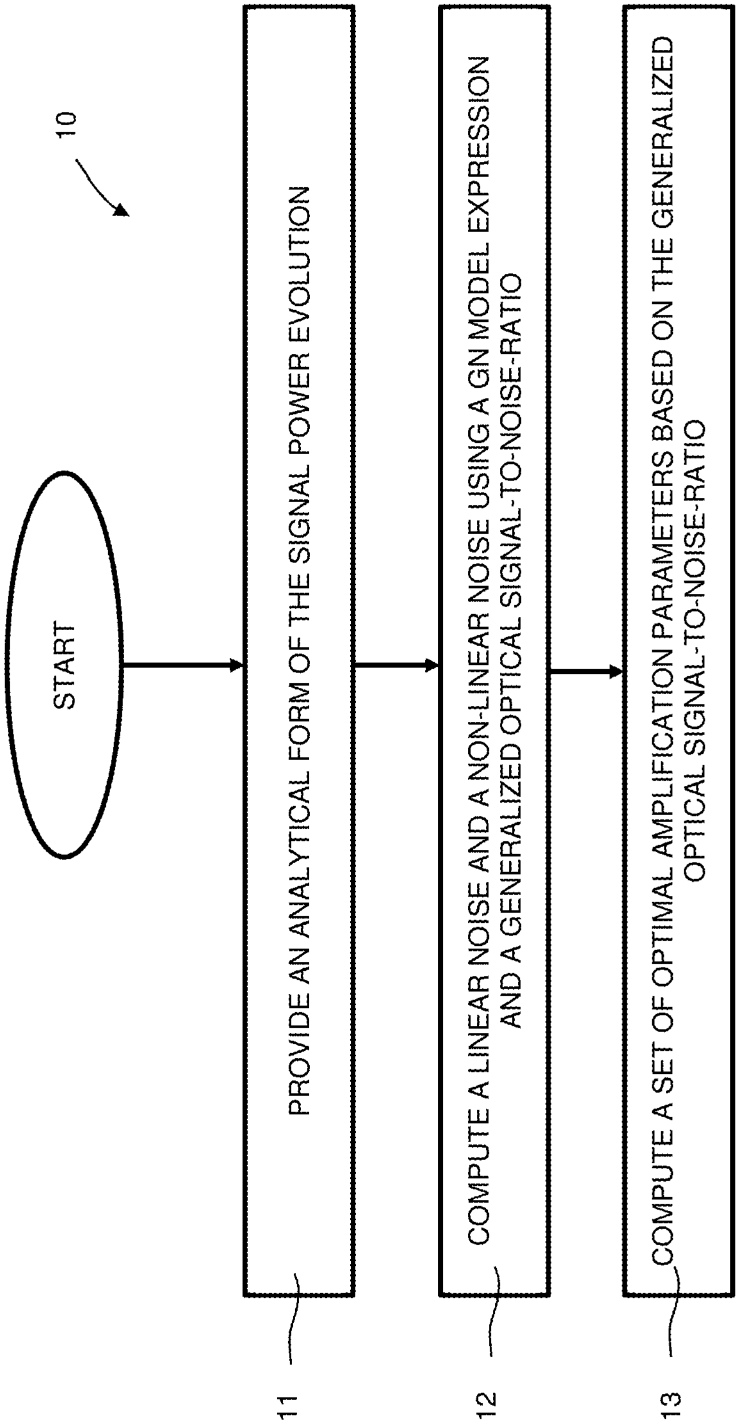
FIG. 2 illustrates a flowchart of a method for computing a set of optimal amplification parameters for a span of a multi-span optical fiber network according to a first embodiment of the invention.

FIG. 2 illustrates a flowchart of a method for computing a set of optimal amplification parameters for a span of a multi-span optical fiber network 10 according to a first embodiment.

In particular, FIG. 2 illustrates a flowchart of a method for computing a set of optimal amplification parameters for a span of a multi-span optical fiber network 10, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is connected to launch optical signals into a remainder of a corresponding optical transmission line.

According to the first embodiment, the at least one discrete amplifier is an erbium-doped fiber amplifier (EDFA) and, in particular, an EDFA with built in variable optical attenuator (VOA).

As shown in FIG. 2, the method 10 again comprises a step of providing an analytical form of the signal power evolution along the corresponding span 11.

According to the first embodiment, the exponential fit for the normalized signal profile p (z) is used, which is described by the following formula:

$$p(z) = b_1 \exp(-\alpha_s z) - b_2 \exp(-\alpha_2 z), \quad (1)$$

wherein the variable z defines, respectively indicates the length along the span, starting from a corresponding ingress node.

Coefficients $b_1$ and $b_2$ are further computed from the forward Raman gain value $G_{FWD}$ in linear units, as $$b_1 = G_{FWD};\ b_2 = G_{FWD} - 1 \quad (2)$$

Further, the coefficient $\alpha_2$, which is set to optimize signal profile fit, does not depend on signal forward Raman gain and slaved to the signal fiber attenuation $\alpha_s$ $$\alpha_2 = 1.45 * \alpha_s \quad (3)$$

As shown in FIG. 2, the method 10 also again comprises a step of computing a linear noise from amplifier noise figures and a non-linear noise generated in the corresponding span based on information about the span and the analytical form of the signal power evolution and using the computed linear noise and non-linear noise and information about the span to compute the impact on the span performance 12.

Therein, the information about the span includes a span length, information about the associated transmission fiber, information about the associated amplifiers, a symbol rate of a corresponding transceiver and a system channel plan.

In particular, according to the first embodiment, formula (1) is then applied to the Gaussian Noise model closed from analytical expression, in particular to the full numerical 3D integral Gaussian Noise expression for the nonlinear noise density, whereby the closed-form analytical Gaussian Noise expression for the normalized nonlinear noise variance $VAR_{NLI}$ for the middle, if the computation is carried out during a planning phase of a network deployment, respectively the worst channel for the $i_{th}$-span, if the computation is carried out as part of a network turn-up and commissioning, can be derived:

$$VAR_{NLI_i} = \eta_i P_i^2, \quad (5)$$

wherein the nonlinear efficiency coefficient $\eta_i$ for the $i_{th}$-span is defined as $$\eta_i = B_n \left(\frac{2.0}{3.0}\right)^3 \frac{\gamma^2}{R_s^3} \left[ \Gamma_1 L_{eff}^2(\alpha_s) \frac{\operatorname{asinh}\left(\frac{\pi^2}{2}|\beta_2| L_{eff,a}(\alpha_s) R_s^2 N_{ch}^{2\frac{R_s}{\Delta f}}\right)}{\pi^2 |\beta_2| L_{eff,a}(\alpha_s)} + \Gamma_2 L_{eff}^2(\alpha_2) \frac{\operatorname{asinh}\left(\frac{\pi^2}{2}|\beta_2| L_{eff,a}(\alpha_2) R_s^2 N_{ch}^{2\frac{R_s}{\Delta f}}\right)}{\pi^2 |\beta_2| L_{eff,a}(\alpha_2)} \right], \quad (6)$$

wherein the nonlinear efficiency coefficient $\eta_i$ depends on modulated signal symbol rate value $R_s$, the channel slot $\Delta f$, and channel count $N_{ch}$.

Coefficients $G_1$ and $G_2$ in the Expression (6) are Defined as $$\Gamma_1 = b_1^2 - 2 b_1 b_2 \frac{\alpha_s}{\alpha_s + \alpha_2} \quad (7)$$

$$\Gamma_2 = b_2^2 - 2 b_1 b_2 \frac{\alpha_2}{\alpha_s + \alpha_2} \quad (8)$$

In particular, the closed-form analytical Gaussian Noise expressions (5-8) for the normalized nonlinear noise variance $VAR_{NLI}$ were derived by applying formula (1) to the full numerical 3D integral Gaussian Noise expression for the nonlinear noise density. Further, computation of (5-8) for the normalized nonlinear noise variance $VAR_{NLI}$ respectively the worst channel for the $i_{th}$-span is carried out as part of a network turn-up and commissioning. Further, the nonlinear efficiency coefficient $\eta_i$ can be scaled to the bandwidth $B_n$=12.5 GHZ (0.1 nm) to match an optical signal-to-noise-ratio scaled with the same bandwidth, and depends on transmission fiber attenuation as in linear units for signal power, related to the fiber loss Q de for signal power in engineering units $\alpha_s = \alpha_{dB} * 0.1 * \ln(10)$, plus related characteristics, like effective loss length $L_{eff}(\alpha)$ $$L_{eff}(\alpha) = \frac{1 - e^{-\alpha L}}{\alpha},$$

wherein L is the span length, and plus the asymptotic effective loss length $L_{eff,a}(\alpha)$ $$L_{eff,a} = \frac{1}{\alpha}.$$

The nonlinear efficiency coefficient $\eta_i$ also depends on fiber group-velocity dispersion parameter $\beta_2$, related to the fiber dispersion parameter D, used in engineering $$\beta_2 = -\frac{\lambda^2 D}{2 \pi c},$$

and on the fiber nonlinear coefficient $$\gamma = \frac{2\pi n_2}{\lambda A_{eff}}.$$

Further, in expression (6) asinh means the inverse hyperbolic sine function.

An impact on the span performance, in particular the span inverse optical signal-to-noise-ratio OSNR for the $i_{th}$-span at the output of the in-EDFA can be computed as $$\frac{1}{OSNR_i} = \frac{P_{ase,i}}{P_{max\_per\_ch,i}} = \frac{NF_{eff,i}\, 10^{-8.79}}{P_i}, \quad (9)$$

which is based on the signal max power per channel $P_{max\_per\_ch,i}$ and ASE noise power $P_{ase,i}$.

According to the first embodiment, further linear equivalents of the information about the span, respectively parameters representing the information about the span with linear units are used to compute the impact on the span performance, wherein $$G_i = \text{span } amp \text{ gain (normalized linear units)} = 10^{0.1*G_i\,(dB)}$$

$$\text{Loss}_i = \text{span loss (normalized linear units)} = 10^{-0.1*Loss_i\,(dB)}$$

$$NF_i = \text{span } amp \text{ noise figure (normalized linear units)} = 10^{0.1*NF_i\,(dB)}$$

$$P_i = \text{signal power (linear units } W) = 10^{0.1*P_i\,(dBm)} / 1000$$

As further shown in FIG. 2, the method 10 also again comprises a step of computing a set of optimal amplification parameters for the corresponding span based on the impact on the span performance 13.

According to the first embodiment, the set of optimal amplification parameters comprises an optimal value of the forward Raman amplifier gain $G_{FWD\ Raman,i}$, an optimal value of the gain of the EDFA amplifier $G_{EDFA,i}$ and an optimal value of a signal input power launched into the fiber span $P_i$.

According to the first embodiment, the associated amplifiers further comprise a backward Raman amplifier, wherein the set of optimal amplification parameters also includes an optimal value of the backward Raman amplifier gain $G_{Raman\ BWD,i}$.

The associated amplifiers might also include a remote optically pumped amplifier to complement for the EDFA and the backward Raman amplifier.

Therein, the ASE noise power for the $i_{th}$-span $P_{ase,i}$ can be computed based on the following equations:

$$P_{ase,i} = G_{eff,i}\, NF_{eff,i}\, 10^{-8.79} \quad (10)$$

$$G_{eff,i} = G_{FWD\ Raman,i} * \text{Loss}_i * G_{Raman\ BWD,i} * G_{EDFA,i} \quad (11)$$

$$NF_{eff,i} = \frac{NF_{Raman\ BWD,i} + \frac{NF_{EDFA,i} - 1}{G_{Raman\ BWD,i}}}{G_{FWD\ Raman,i}\ \text{Loss}_i} \quad (12)$$

In expression (11), factor ($G_{eff,i}-1$) was replaced for simplicity by $G_{eff,i}$ and the factor $10^{-8.79}$ was derived from the standard expression composed of physical constants:

$$-8.79 = \text{LOG10}(h * v * 12.5E9\ \text{Hz}),$$

wherein n=193.8 THz (1546.9 nm) is the central wavelength in C-band

Further, in the expression (10) the signal power $P_i$ into the $i_{th}$-span fiber is slaved to the maximum optical output power per channel $P_{max\_per\_ch,i}$, as $$P_{max\_per\_ch,i} = P_i * G_{FWD\ Raman,i} * \text{Loss}_i * G_{Raman\ BWD,i} * G_{EDFA,i} \quad (13)$$

Thus, a method computing a set of optimal amplification parameters for a span of a multi-span optical fiber network 10 is provided, with which the set of optimal amplification parameters can be computed in such a way, that the best possible performance of the corresponding span can be achieved.

Based on the computed set of optimal amplification parameters, amplification parameters for the span of the multi-span optical fiber network can then respectively correspondingly be set, whereby a maximum error-free reach and capacity can be produced.

In total, the multi-span optical fiber network with multiple types of amplification in the same span can be operated in an optimal way.

Figure 3:
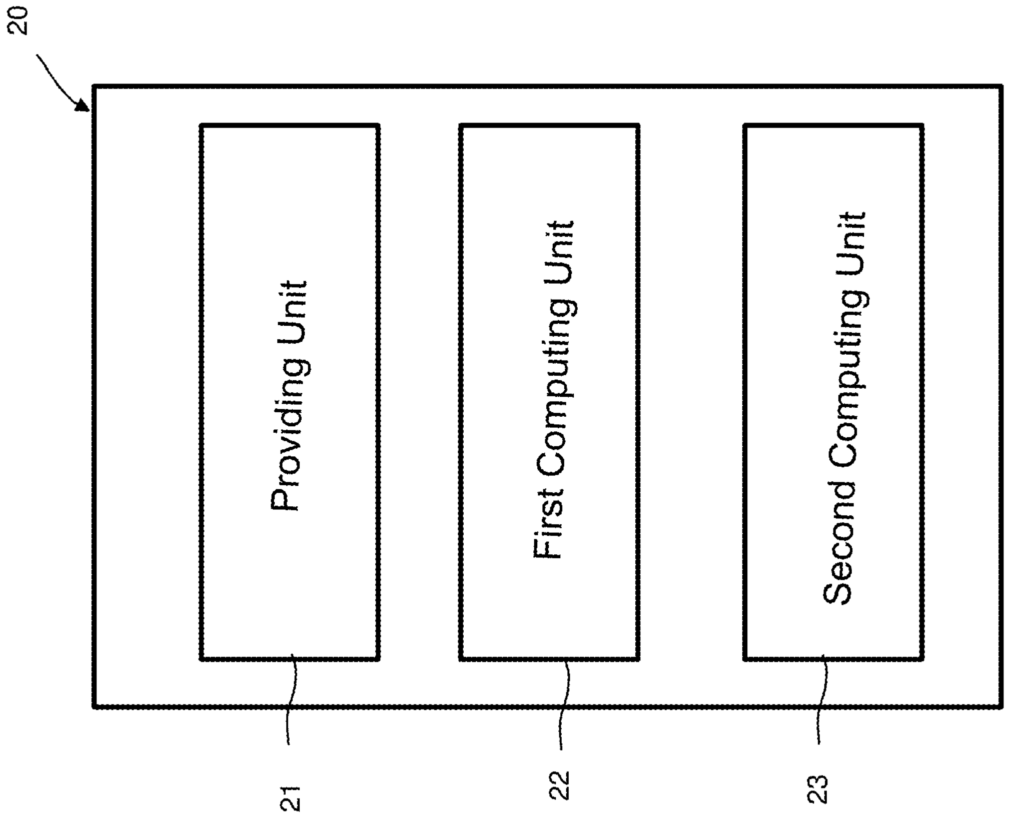
FIG. 3 illustrates a network control device for computing a set of optimal amplification parameters for a span of a multi-span optical fiber network according to embodiments of the invention.

FIG. 3 illustrates a network control device for computing a set of optimal amplification parameters for a span of a multi-span optical fiber network 20 according to embodiments of the invention.

In particular, FIG. 3 illustrates a network control device for computing a set of optimal amplification parameters for a span of a multi-span optical fiber network 20, wherein each span has an associated optical transmission fiber connected to associated amplifiers, wherein the associated amplifiers include a forward Raman amplifier and at least one discrete amplifier, wherein gain and output power of the at least one discrete amplifier are respectively controlled independently, wherein the last of the at least one discrete amplifier is connected to launch optical signals into a remainder of a corresponding optical transmission line.

As shown in FIG. 3, the network control device 20 comprises a providing unit 21, wherein the providing unit 21 is configured to provide an analytical form of the signal power evolution along the corresponding span, a first computing unit 22, wherein the first computing unit 22 is configured to compute a linear noise from amplifier noise figures and a non-linear noise generated in the corresponding span based on information about the span and the analytical form of the signal power evolution and to use the computed linear noise and non-linear noise and information about the span to compute the impact on the span performance, and a second computing unit 23, wherein the second computing unit 23 is configured to compute a set of optimal amplification parameters for the corresponding span based on the impact on the span performance.

Therein, the providing unit, the first computing unit and the second computing unit can for example respectively be realized based on code that is stored in a memory and executable by a processor to process correspondingly acquired parameters.

The information about the span again includes a span length, information about the associated transmission fiber, information about the associated amplifiers, a symbol rate of a corresponding transceiver and a system channel plan.

Further, the set of optimal amplification parameters again comprises one or more of an optimal value of the forward Raman gain, an optimal value of the gain of the at least one discrete amplifier, and an optimal value of a signal input power launched into the corresponding span.

The network control device 20 is further configured to use linear equivalents of the information about the span, respectively parameters representing the information about the span with linear units to compute the amplifier noise figure.

In one embodiment, the set of optimal amplification parameters is computed during a planning phase of a network deployment, wherein preliminary or typical values are chosen for the information about the span.

In a further embodiment, the set of optimal amplification parameters is computed as part of a network turn-up and commissioning, wherein exact values are chosen for the information about the span.

The shown network control device 20 is further configured to execute a method for computing a set of optimal amplification parameters for a span of a multi-span optical fiber network as described above.

REFERENCE SIGNS

1 method
2 step
3 step
4 step
10 method
11 step
12 step
13 step
20 network control device
21 providing unit
22 first computing unit
23 second computing unit

The invention claimed is:

1. A method for computing a set of optimal amplification parameters for a span of a multi-span optical fiber network, wherein each span has an associated optical transmission fiber connected to associated amplifiers, wherein the associated amplifiers comprise a forward Raman amplifier and at least one discrete amplifier, wherein gain and output power of the at least one discrete amplifier are respectively controlled independently, wherein a last of the at least one discrete amplifier is connected to launch optical signals into a remainder of a corresponding optical transmission line, the method comprising:

providing an analytical form of a signal power evolution along a corresponding span;

computing a linear noise from amplifier noise figures and a non-linear noise generated in the corresponding span based on information about the span and the analytical form of the signal power evolution and using the computed linear noise and non-linear noise to compute an impact on a span performance; and computing the set of optimal amplification parameters for the corresponding span based on the impact on the span performance.

2. The method according to claim 1, wherein the information about the span comprises a span length, a span loss, information about the associated optical transmission fiber, information about the associated amplifiers, a symbol rate of a corresponding transceiver, and a system channel plan.

3. The method according to claim 1, wherein the set of optimal amplification parameters comprises one or more of an optimal value of a forward Raman gain, an optimal value of a gain of the at least one optical amplifier, and an optimal value of a signal input power launched into the span.

4. The method according to claim 1, wherein parameters representing the information about the span with linear units are used to compute the impact on the span performance.

5. The method according to claim 1, wherein the set of optimal amplification parameters for the corresponding span is computed during a planning phase of a network deployment, wherein preliminary or typical values are chosen for the information about the span.

6. The method according to claim 1, wherein the set of optimal amplification parameters for the corresponding span is computed as part of a network turn-up and commissioning, wherein exact values are chosen for the information about the span.

7. A computer program product, comprising: a non-transitory computer readable medium having stored thereon a computer executable instruction(s) to execute a method for computing the set of optimal amplification parameters for the span of the multi-span optical fiber network according to claim 1.

8. A method for setting amplification parameters for a span of a multi-span optical fiber network, wherein each span has an associated optical transmission fiber connected to associated amplifiers, wherein the associated amplifiers comprise a forward Raman amplifier and at least one discrete amplifier, wherein gain and output power of the at least one discrete amplifier are respectively controlled independently, wherein the at least one discrete amplifier is connected to launch optical signals into a remainder of a corresponding optical transmission line, the method comprising:

computing a set of optimal amplification parameters for a corresponding span by providing an analytical form of a signal power evolution along a corresponding span; computing a linear noise from amplifier noise figures and a non-linear noise generated in the corresponding span based on information about the span and the analytical form of the signal power evolution and using the computed linear noise and non-linear noise to compute an impact on a span performance; and computing the set of optimal amplification parameters for the corresponding span based on the impact on the span performance; and setting the amplification parameters of the corresponding span based on the computed set of optimal amplification parameters.

9. A network control device for computing a set of optimal amplification parameters for a span of a multi-span optical fiber network, wherein each span has an associated optical transmission fiber connected to associated amplifiers, wherein the associated amplifiers comprise a forward Raman amplifier and at least one discrete amplifier, wherein gain and output power of the at least one discrete amplifier are respectively controlled independently, wherein a last of the at least one discrete amplifier is connected to launch optical signals into a remainder of a corresponding optical transmission line, the network control device comprising:

a providing unit configured to provide an analytical form of the signal power evolution along a corresponding span;

a first computing unit configured to compute a linear noise from amplifier noise figures and a non-linear noise generated in the corresponding span based on information about the span and the analytical form of the signal power evolution and to use the computed linear noise and non-linear noise to compute an impact on a span performance; and a second computing unit configured to compute the set of optimal amplification parameters for the corresponding span based on the impact on the span performance.

10. The network control device according to claim 9, wherein the information about the span comprises a span length, a span loss, information about the associated optical transmission fiber, information about the associated amplifiers, a symbol rate of a corresponding transceiver and a system channel plan.

11. The network control device according to claim 9, wherein the set of optimal amplification parameters comprises one or more of an optimal value of the Raman gain, an optimal value of a gain of the at least one optical amplifier and an optimal value of a signal input power launched into the span.

12. The network control device according to claim 9, wherein the first computing unit is configured to use parameters representing the information about the span with linear units to compute the impact on the span performance.

13. The network control device according to claim 9, wherein the set of optimal amplification parameters for the corresponding span are computed during a planning phase of a network deployment, wherein preliminary or typical values are chosen for the information about the span.

14. The network control device according to claim 9, wherein the set of optimal amplification parameters for the corresponding span is computed as part of a network turn-up and commissioning, wherein exact values are chosen for the information about the span.

15. A system for setting amplification parameters for the span of the multi-span optical fiber network, the system comprising:

a network control device for computing the set of optimal amplification parameters for the span of the multi-span optical fiber network according to claim 8; and a setting unit configured to set the amplification parameters of the corresponding span based on the set of optimal amplification parameters computed by the network control device.

* * * * *